US012213238B2

(12) United States Patent
Flachenecker

(10) Patent No.: US 12,213,238 B2
(45) Date of Patent: Jan. 28, 2025

(54) REFLECTION TARGET X-ray SOURCE WITH STEERED BEAM ON TARGET

(71) Applicant: Carl Zeiss X-ray Microscopy, Inc., Dublin, CA (US)

(72) Inventor: Claus Flachenecker, Hayward, CA (US)

(73) Assignee: Carl Zeiss X-ray Microscopy, Inc., Dublin, CA (US)

(*) Notice: Subject to any disclaimer, the term of this patent is extended or adjusted under 35 U.S.C. 154(b) by 15 days.

(21) Appl. No.: 17/967,958

(22) Filed: Oct. 18, 2022

(65) Prior Publication Data

US 2024/0130028 A1 Apr. 18, 2024

(51) Int. Cl.
*H05G 1/52* (2006.01)

(52) U.S. Cl.
CPC .................................... *H05G 1/52* (2013.01)

(58) Field of Classification Search
CPC ........ H01J 35/153; H01J 35/147; H01J 35/08; H01J 35/025; H01J 2235/086; H01J 2235/081; H01J 2235/088; H01J 35/16; H01J 35/116; H01J 2235/165; H01J 35/18; H01J 35/13; H01J 2235/167; H01J 2235/122; H01J 2235/1216; H01J 2235/1262; H01J 35/12; H01J 2235/168; H01J 2235/166; H01J 35/14; H01J 2235/1204; H01J 35/30; H01J 35/106; H01J 33/04; H01J 35/20; H01J 2235/127; H01J 35/1017; H01J 35/186; H01J 35/066; H01J 35/064; H01J 35/045; H01J 35/112; H01J 35/065; H01J 35/06; H01J 35/10; H01J 35/24; H01J 35/02; H05G 1/26; H05G 1/02; H05G 2/005; H05G 2/008; H05G 2/006;
(Continued)

(56) References Cited

U.S. PATENT DOCUMENTS 5,199,054 A 3/1993 Adams et al.
5,442,678 A 8/1995 Dinsmore et al.
(Continued)

FOREIGN PATENT DOCUMENTS

DE 10 2005/041923 A1 3/2007
EP 0173047 A2 3/1986
(Continued)

OTHER PUBLICATIONS

Partial European Search Report dated on Mar. 6, 2024, from European Application No. 23198277.8, filed on Sep. 19, 2023. 15 pages.
(Continued)

*Primary Examiner* — Irakli Kiknadze
(74) *Attorney, Agent, or Firm* — HoustonHogle LLP

(57) ABSTRACT

A method for controlling an x-ray source comprises generating an electron beam for striking the target to generate x-rays and steering the electron beam to a desired location on the target using a first and a second steering system distributed along a flight tube. In this way, the beam can be steering to the desired location while also passing through the center of a focusing lens to maintain optimal beam characteristics. Also possible is scanning the electron beam over the target to find a fiducial mark. Then, a desired location can be found as an offset from this mark.

17 Claims, 9 Drawing Sheets

(58) Field of Classification Search

CPC .. H05G 1/04; H05G 1/54; H05G 1/46; H05G 1/30; H05G 1/06; H05G 1/52; H05G 1/32; H05G 1/56; H05G 1/34; H05G 1/025; H05G 1/58; H01L 21/0274; G21K 5/00; G21K 7/00; A61B 18/1206; A61B 2018/00886; A61B 2018/00857; A61B 2018/1253; A61B 2018/124; A61B 2018/00702; A61B 2018/00761; A61B 2018/00738; A61B 2018/1273; A61B 2018/00875; A61B 6/032; A61B 6/4021; A61B 6/405; A61B 6/40; A61M 2230/04; A61M 2230/005; A61N 5/10; G01N 23/046

USPC .......................................... 378/119, 137–138

See application file for complete search history.

(56) References Cited

U.S. PATENT DOCUMENTS

| | | | | |
|---|---|---|---|---|
| 7,057,187 | B1 | 6/2006 | Yun et al. | |
| 11,164,713 | B2 * | 11/2021 | Besen | H01J 35/12 |
| 11,315,751 | B2 | 4/2022 | Safai | |
| 2011/0142193 | A1 * | 6/2011 | Frontera | H01J 35/147 378/138 |
| 2014/0254767 | A1 * | 9/2014 | Boye | H01J 35/066 378/136 |
| 2023/0238204 | A1 * | 7/2023 | Hansson | A61B 6/4021 378/62 |
| 2024/0087833 | A1 * | 3/2024 | Ando | H01J 35/16 |

FOREIGN PATENT DOCUMENTS

| | | | | |
|---|---|---|---|---|
| EP | 0173047 | A3 | 3/1988 | |
| EP | 2763156 | A1 | 8/2014 | |
| EP | 3093867 | B1 * | 5/2021 | H01J 35/025 |
| JP | 2006/024522 | A | 1/2006 | |

OTHER PUBLICATIONS

European Search Report received in European Application No. 23198277.8, mailed on on Jul. 2, 2024, 17 pages.

* cited by examiner

REFLECTION TARGET X-ray SOURCE WITH STEERED BEAM ON TARGET

BACKGROUND OF THE INVENTION

X-rays are widely used in microscopy because of their short wavelengths and ability to penetrate objects. Typically, the best source of x-rays is a synchrotron, but these are expensive systems. So, often so-called tube or laboratory x-ray sources are used in which a generated electron beam bombards a target. The resulting x-rays include characteristic line(s) determined by the target's elemental composition and broad bremsstrahlung radiation.

There are a few basic configurations for x-ray microscopy systems. Some employ a condenser to concentrate the x-rays onto the object under study and/or an objective lens to image the x-rays after interaction with the object. The resolution and aberrations associated with these types of microscopes are usually determined by the spectral characteristics of the x-rays.

A more common configuration is a projection microscopy system. A typically small x-ray source spot is used often in conjunction with geometric magnification to image the object. A large panel x-ray detector can then be used to detect the x-ray passing through the object. Another detector configuration uses a combination of x-ray and optical magnification. An example is shown in U.S. Pat. No. 7,057,187. Here, a relatively small image on a scintillator is magnified and captured by a camera. Another option for detecting x-rays utilizes semiconductor direct conversion detection materials. The x-rays or particles create free charge carriers that are directed to a spatial light modulator, such as a liquid crystal (LC) light valve. The electrical charge of the carriers modulate the light valve, which is then illuminated by an external light source of an optical microscope to readout the detector.

In all of these configurations, performance and particularly resolution are affected by different factors. Because the projection configuration does not have aberrations, the resolution is typically determined by the size of the x-ray source spot, and thus microfocus x-ray sources are employed. Generally, the source spot size is determined by the electron optics and the ability of those optics to focus the electron beam down to a point. Source spot sizes are generally sub-micrometer to 200 micrometers (μm) with good electron optics. In any event, x-ray-source sizes will generally limit the resolution of an x-ray projection microscope.

In microscopy applications, microfocus transmission or reflection-target x-ray sources are used. In the basic configuration of an x-ray tube, thermionic or field emission electrons are generated at a cathode (filament) in a vacuum tube and accelerated in a vacuum to an anode (forming an electron beam which is shaped by different electrostatic and electromagnetic optical elements. For example, magnetic lenses often use coils of copper wire inside iron pole pieces. A current through the coils creates a magnetic field in the bore of the pole pieces. The electron beam then strikes the target either orthogonally with a transmission source or at an oblique angle for a reflection source. Common target materials are for instance tungsten, copper, and chromium.

In high magnification projection microscopy systems, movements in the x-source spot on the target should be minimized. Horizontal x-ray spot movement leads to a center-shift of the projected rotation axis. In a reflection target, for a horizontal setup, a horizontal x-ray spot movement is also tied to an axial spot movement, which results in a change of geometric magnification. Sometimes a tube is mounted vertically "from below/above", and the beam gets "compressed" in the vertical direction. Then a vertical beam displacement would lead to a change in geometric magnification.

Spot movements can have two main contributors. Static movement occurs with changes in operating parameters such as electron energy, beam intensity, tube alignment, etc. Dynamic movement is mostly as a function of temperature.

An additional problem is potential target burn-in, which leads to a needle-like hole drilled by the electron beam. The x-ray spot generated by this burn-in leads to an x-ray spectrum that varies significantly. In the case of a reflection target, the spectrum varies in the direction of the target tilt, and negatively affects tomographic reconstruction quality.

SUMMARY OF THE INVENTION

The present invention can deal with a number of problems associated with laboratory x-ray sources. It can be used to address target burn-in and also extend the life of x-ray targets in general.

It can also be used to stabilize the position of the x-ray spot on the target to center-shifts and/or axial spot movements.

An additional problem such as target burn-in, which leads to a needle-like hole drilled by the electron beam, can also be addressed. The X-ray spot generated by this burn-in leads to an X-ray spectrum that varies significantly in the direction of the target tilt, and negatively affects X-ray reconstruction.

The present approach concerns active control of the spot position. This mitigates against spot shift/drift. The beam is steered so that it maintains the same target spot of an imaging scan. Moreover, the beam is steered such that it passes always through the center of the focus lens to maintain good spot dimensions. Specifically, dual-stage steering can be used to always steer the e-beam through the magnetic lens center while changing the angle at which the beam is going through the lens. Calibration of steering currents to the beam position on the target can be performed as a function of the source control parameters. That way always the same target position is bombarded with electrons. Typical control parameters include electron energy, emission current and e-beam focusing current. However, also environmental variables can be included into the stability calibration, such as various component temperatures.

To deal with target burn-in, it is also possible to use the e-beam steering to select a new X-ray emission spot on the target. So, after a burn-in happens, a new unharmed spot can be selected and used for X-ray emission.

In general, according to one aspect, the invention features a method for controlling an x-ray source. This method comprises generating an electron beam for striking the target to generate x-rays and steering the electron beam to a desired location on the target using a first and a second steering system distributed along a flight tube.

In general, according to one aspect, the invention features a method for controlling an x-ray source. This method comprises generating an electron beam for striking the target to generate x-rays and scanning the electron beam over the target to find a fiducial mark or analyze target damage or burn-in.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term “and/or” includes any and all combinations of one or more of the associated listed items. Further, the singular forms and the articles “a”, “an” and “the” are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
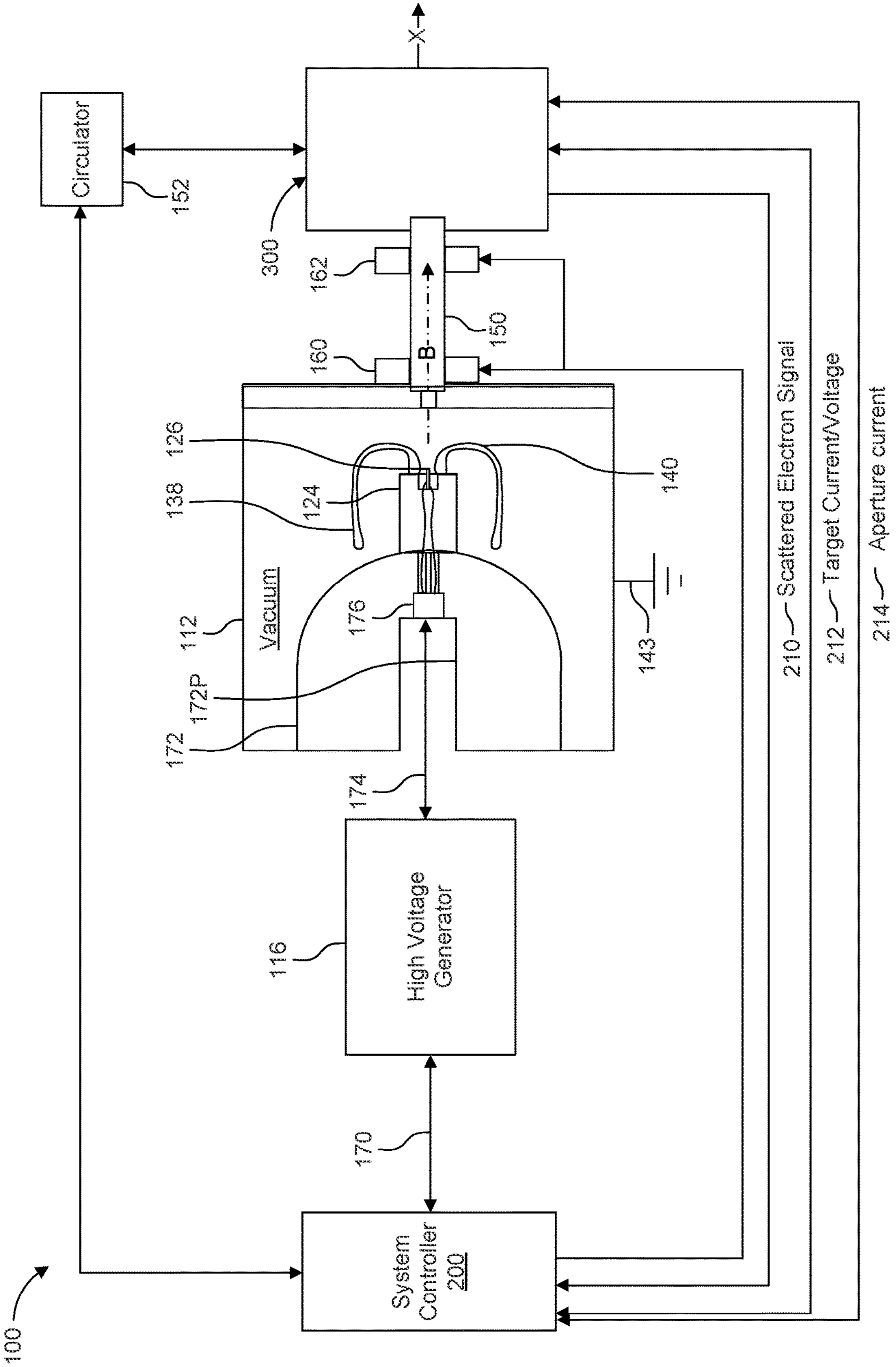
FIG. 1 is a schematic cross-sectional view of a reflective x-ray source.

FIG. 1 is a schematic cross-sectional view of an x-ray source 100.

The illustrated embodiment is a “reflection-target” source but many of the principles here are agnostic with respect to reflector or transmission devices.

The electron beam B strikes a target in the focus lens head assembly 300 at an oblique angle and the x-rays, which are emitted from the target, are used for illuminating an object. That said, many aspects of the following innovations are equally applicable to other x-ray tube source configurations including rotating anode and metal jet anode and transmission targets.

In general, the x-ray source comprises a vacuum vessel 112. Preferably, the vacuum vessel 112 is metal, such as aluminum or stainless steel, for strength against the vacuum. Generally, the vacuum vessel 112 defines a volumetric evacuated region through which the electron beam B propagates from the electron emitter 126 (filament or cathode), to the target in the focus lens head assembly 300.

A system controller 200 is located outside the vacuum vessel 112. This contains the main controller and the data interfaces to external devices. It also contains the power supply for connection to a main electricity supply.

A high voltage generator 116 generates the power at the voltages required by the electron emitter 126. The high voltage generator 116 in a current example generates a negative acceleration voltage of 10’s to 100’s of kilovolts. The high voltages can also be provided via a power and control umbilical 170.

A vessel body 172 projects into the volumetric region defined by the vacuum vessel 112 from the proximal side of the vessel. It has an inner umbilical port 172P that extends through the vessel body 172 in the distal direction enabling the power umbilical to reach an umbilical plug assembly 176.

The electron emitter 126, e.g., filament, is held in a filament mount 124, which is supported at the distal end of vessel body 172. In a current example, the electron emitter 126 includes a tungsten hairpin. It projects into the vacuum of the vacuum vessel to function as a thermionic source or electron emitter (cathode). Other configurations are possible, such as Lanthanum Hexaboride (LaB6) crystal and a carbon heater rod, CeB6, HfC and carbon-nanotube filaments.

A protective field cap 138 has a general bell shape, extending over the electron emitter 126 and its filament mount 124 and wrapping back to the distal end of the vessel body 172. Its distal end functions as a suppression or grid anode 140. It aids in regulating the shape and intensity of the emitted electrons that form beam B.

The beam B is directed into a flight tube 150 mounted to a distal wall of the vacuum vessel 112.

Along the flight tube 150 are arranged a flight tube beam steering and shaping system to condition the electron beam and guide the beam to a center of a subsequent focus lens and head assembly 300. Preferably, the flight tube beam steering and shaping system is comprised of a first multipole (such as an octupole) steering system 160 and a second multipole (such as an octupole) steering system 162. Each of these systems comprises at least two or three and preferably eight electromagnet coils that generate magnetic fields under the control of the system controller 200 to guide and shape the electron beam B.

The electron beam is then received by the focus lens and head assembly 300. This has the reflection target that the electron beam strikes to create the x-ray beam X.

The system controller 200 preferably receives three feedback signals from the focus lens and head assembly 300. A scattered electron signal 210 indicates the number of electrons that are scattered off of the target. A target current/voltage signal 212 indicates the current generated in the isolated target and thus is indicative of the power of the electron beam on the target. Finally, an aperture current signal 214 indicates the number of electrons striking a centering aperture and therefore is indicative of whether the electron beam is centered in this aperture. It should be noted, however, in other configurations only a subset of these three signals may be provided.

Figure 2:
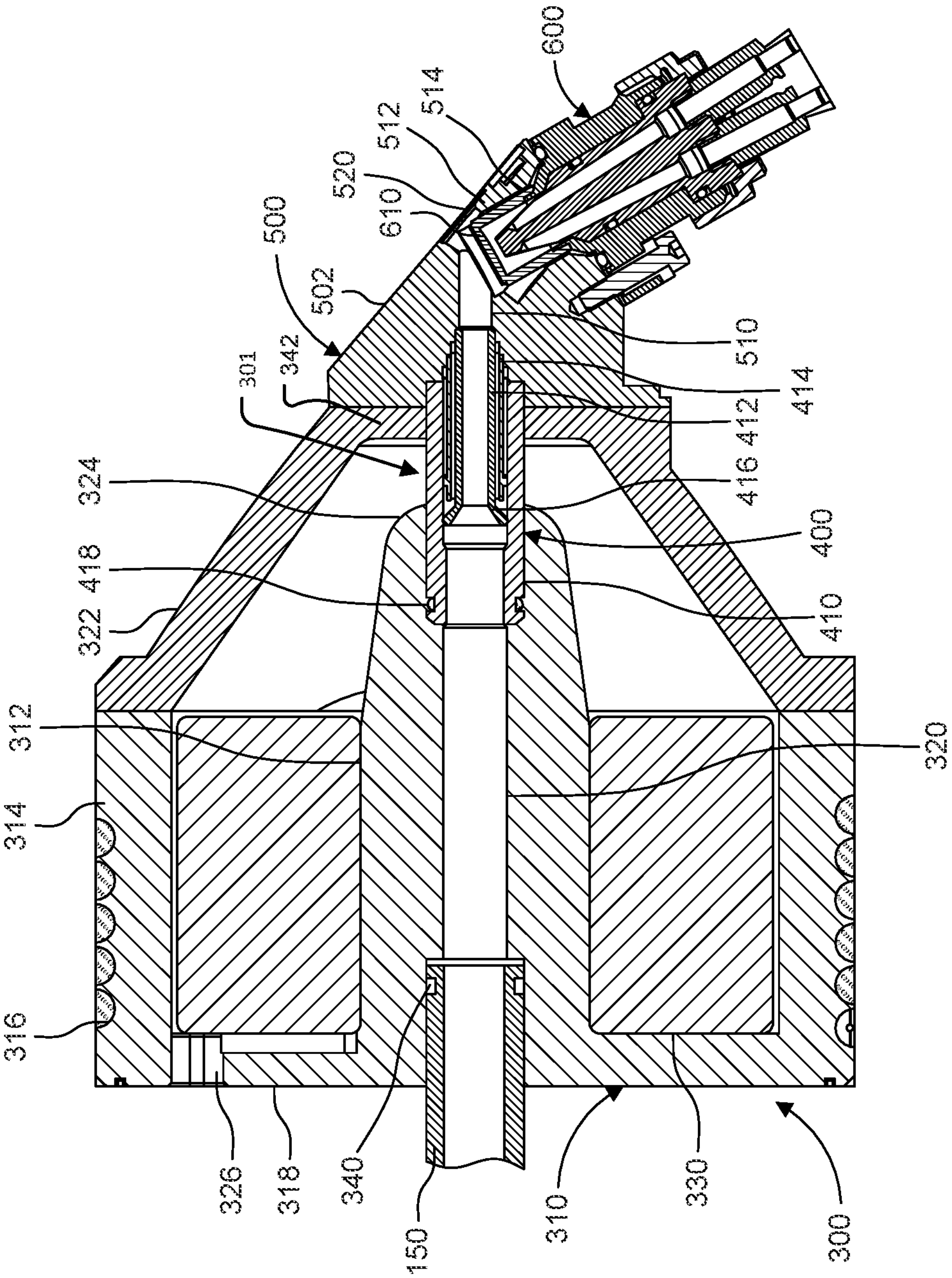
FIG. 2 is a cross sectional view of the focus lens head assembly 300 according to the present invention.

FIG. 2 is a cross sectional view of the reflection target assembly of the focus lens and head assembly 300.

The flight tube 150 extends into a focus yoke 310. The flight tube 150 is coaxial with a yoke beam port 320 formed through a yoke center body 312. A flight tube/yoke o-ring 340 is located between the outer periphery of the flight tube and the inner wall of the yoke beam port 320 in order to provide a vacuum seal.

In general, the magnetic focusing lens 301 includes the yoke center body 312, which is surrounded by a focus coil 330. Electrical current is provided to the focus coil 330 by a set of coil leads 332 from the system controller 200. These leads pass through a yoke wire port 326 formed in an annular shaped yoke rear body 318. The yoke rear body 318 extends from the proximal end of the yoke center body 312 outward to a yoke peripheral body 314. This yoke peripheral body is hollow cylinder-shaped, extending around the outer perimeter of the focus coil 330 and includes ports 316 through which cooling water or oil is flowed.

A yoke cap 322 of the magnetic focusing lens 301 has a generally hollow frusto conical shape. Its proximal end engages with the distal end of the yoke peripheral body 314. Moving distally, converges back to the center axis and terminates with a distal pole tip 342. On the other hand, the yoke center body projects distally and terminates in a proximal pole tip 324.

A centering aperture assembly 400 is coaxial with the flight tube 150 and the yoke beam port 320. It extends between the distal end of the yoke center body 312 and specifically pole tip 324 and an inner aperture through the center of the yoke cap 322.

The centering aperture 416 extends through the center of the yoke cap 322 and seals against a head body 502 of a tube head 500. This extends the vacuum into the tube head so that the electron beam is coupled into a head beam port 510.

A target cartridge 600 holds a target 610 in the head beam port 510. The electron beam passing through the head beam port 510 can then strike this target 610 at an oblique angle. The generated x-rays pass into a head x-ray port 512 and then exit the volume through a x-ray port window 520.

Figure 3:
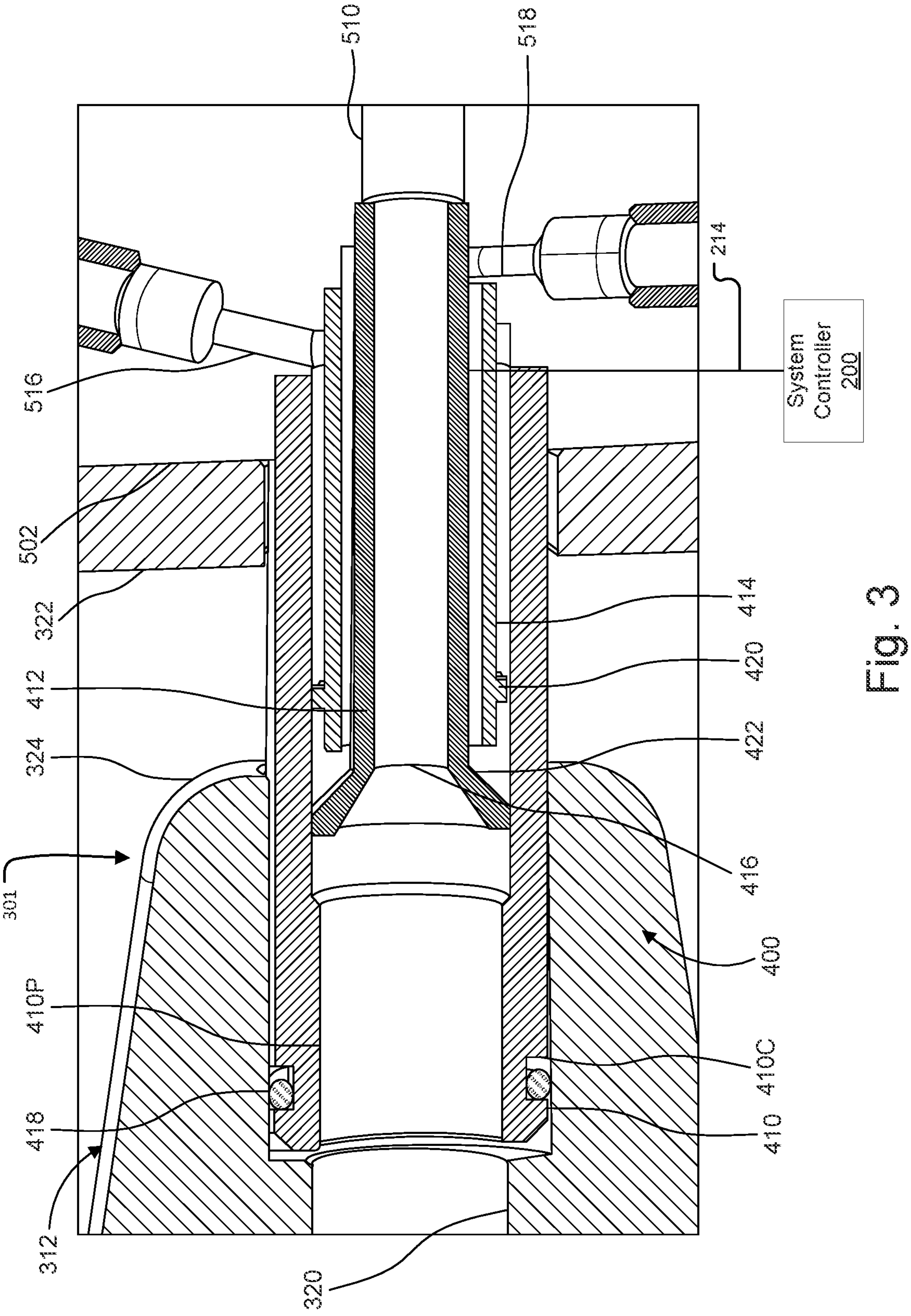
FIG. 3 is a cross sectional view showing the water cooled centering aperture assembly 400 according to the present invention.

FIG. 3 is a cross sectional view showing the water or oil-cooled centering aperture assembly 400.

As a general rule, the centering aperture can be thermally stressed. The electron beam B can contain high levels of power and the centering aperture can absorb some or all of that power depending on the operation mode of the source. In addition, heat generated in the centering aperture can also affect other components such as the focus lens system 300. Thermal cycling can affect its operation. High temperatures can damage the vacuum-sealing O-rings and the focus coil 330.

The current embodiment provides for water or oil cooling of the centering aperture assembly 400. In fact, the centering aperture is directly fluid cooled.

In more detail, sheath tube 410 extends into the distal end of the yoke beam port 320 of the yoke center body 312. A yoke/sheath o-ring 418 is used between the inner wall of an enlarged end of the yoke beam port 320 and the outer face of the sheath tube 410 in order to maintain the vacuum of the flight tube system. In fact, the yoke/sheath o-ring 418 is retained in an annular cut-out 410C formed in the outer face of the sheath tube 410. An internal surface defines a sheath tube beam port 410P. An aperture tube 412 is located inside and concentric with the sheath tube 410. The proximal end 422 of the aperture tube 412 is preferably brazed to the inner wall of the sheath tube and is in communication with the yoke beam port 320. The distal end of the aperture tube 412 is in communication with the head beam port 510 formed in the head body 502 and specifically seals with this port 510. A baffle 414 is located concentrically between the sheath tube and the aperture tube 412 and also seals at its distal end against the head body 502.

The proximal end 422 of the aperture tube 412 has a frusto conical shape to seal against the inner wall of the sheath tube 410. This proximal end narrows moving distally to form the centering aperture 416. Thus, the aperture tube 412 has a decreasing inner diameter in the direction of the target.

The baffle 414 creates a flow channel between the outer wall of the aperture tube 412 and the inner wall of the sheath tube 410. Specifically, a head aperture input coolant port 516 is formed in the head body 502 and connects to the channel between the inner wall of the sheath tube 410 and the outer wall of the distal end of the baffle 414. In a similar vein, a head aperture output coolant port 518 is formed in the head body 502 and is in communication with the region between the outer wall of the aperture tube 412 and the inner wall of the distal end of the baffle 414. In this way, water or oil is then pumped to circulate along the length of the sheath tube 410 and the aperture tube 412 to remove generated heat.

The centering aperture can also be reduced in diameter and thus be transformed into a beam aperture, which can then be used to reject an outer part of the electron beam B, thus allowing for the generation of a smaller focal spot on the target.

In general, heat removal is important for protecting O-rings. Also the centering aperture can be used as a beam dump if it is desired to turn off the x-rays quickly. This is often done while adjusting the beam power and focus to keep the target safe from burn-in and carefully control the x-ray dose applied to the sample. In particular, the controller 200 controls the first octopole steering system 160 and second octopole steering system 162 of the flight tube beam steering and shaping system to steer the electron beam concentrically through the magnetic focusing lens and the aperture tube 412 when generating x-rays. Then, to deactivate the x-rays, the controller controls the first octopole steering system 160 and second octopole steering system 162 to steer the beam away from the centering aperture so that the beam instead preferably strikes and grounds into the proximal end 422 of the aperture tube 412, which is directly water or oil cooled.

The electrical charge on the aperture tube 412 is also monitored via the system controller 200 via the aperture current signal 214, in some examples. This enables the alignment and centering of the beam both at the aperture tube but more importantly through the center of the focus lens system 300 by guiding the beam until the charge on or current from the tube 412 is minimized.

Figure 4:
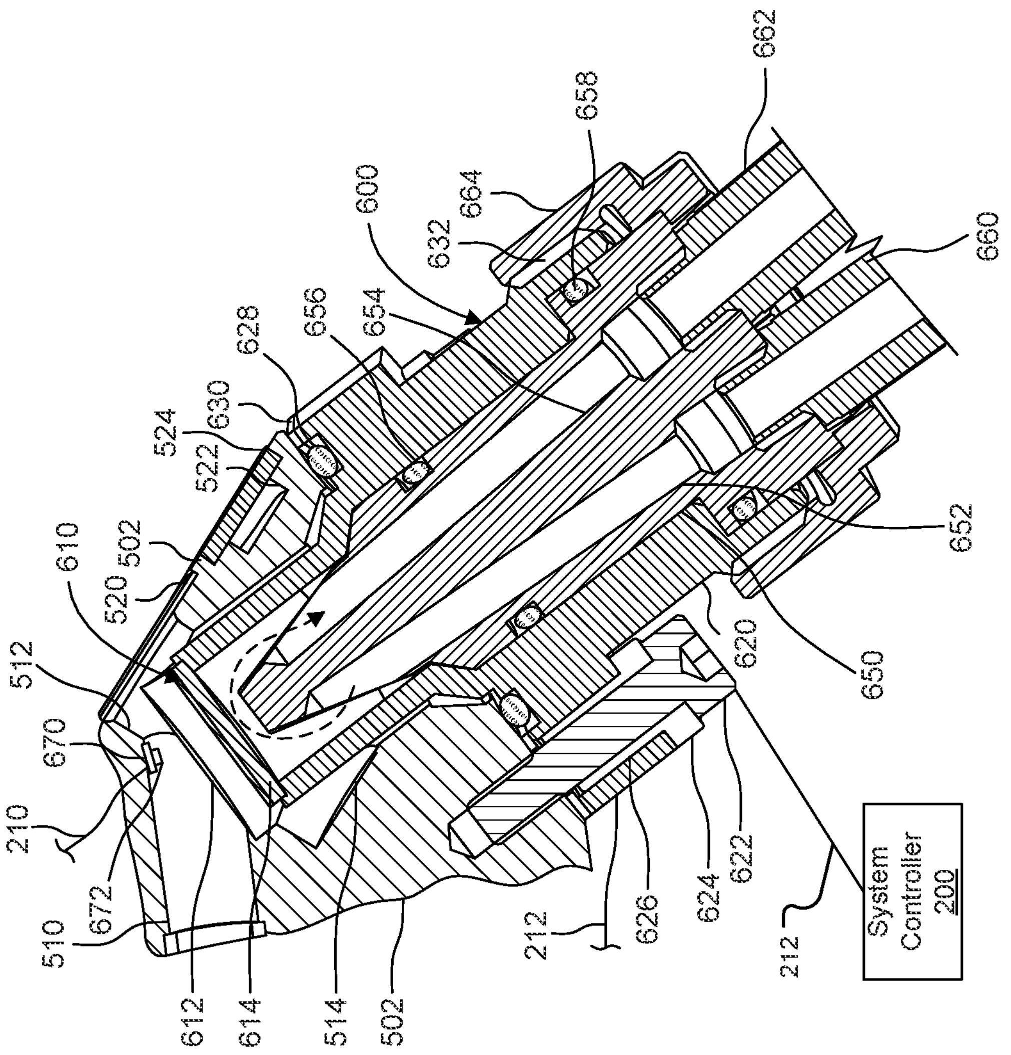
FIG. 4 is a cross sectional view of the water cooled target cartridge mounted in the head body according to the present invention.

FIG. 4 is a cross sectional view of the water or oil cooled target cartridge 600.

During operation, the electron beam strikes the target 610 and generates x-rays by interaction with its target metal layer 612. These x-rays are emitted through the head x-ray port 512 and through an x-ray port window 520 to thereby leave the vacuum of the source.

As a general rule, the target 610 should also be cooled. Most of the energy of the electron beam B is deposited in the target 610 as heat since the process of x-ray generation is rather inefficient. In the worst case, the electron beam can actually burn a hole through the target. This is addressed in the current embodiment by the direct cooling of the target.

In more detail, the target 610 is mounted at the end of a tubular end portion of a cartridge frame 620. The target metal layer 612 faces into the head beam port 510. The metal layer 612 is formed on a target substrate 614 that is preferably brazed to the end of the cartridge frame 620. Preferably, the target substrate 614 is diamond to maximize thermal conductivity and minimize the risk of melting. Also, diamond can be exposed to large electron flux without compromising the vacuum seal. So even if the tungsten melts, the seal between the vacuum and the cooling water or oil will not be compromised.

In a current embodiment, the target metal layer 612 is electrically connected to the cartridge frame. Then the controller 200 monitors the target current and controls the voltage of the target via the target current/voltage control line 212.

The cartridge frame 620 is inserted into a head cartridge port 514 that is formed in the head body 502. A cartridge/head o-ring 628 is located between a shoulder of the cartridge frame 620 and the head body 502. This seals the vacuum of the head beam port 510.

The cartridge frame 620 is mounted to and held in the head body by an arrangement of machine bolts 622. The bolts are inserted into bolt holes 626 of the cartridge frame 620 and are screwed into tapped holes formed in the head body 502. This pulls the shoulder of the cartridge frame 620 against the head body and the target into the head beam port 510. This compresses the cartridge/head o-ring 628 to seal the vacuum.

In the preferred embodiment, the target metal layer 612 is electrically connected to the cartridge frame in the brazing process and the cartridge frame 620 is electrically isolated from the head body 502. This allows for the detection of the electrical current generated by the electron beam striking the target 610 and control of the target voltage by the controller via the target current/voltage control line 212.

This electrical isolation is provided a number of ways. A cartridge isolation ring 620 ensures a standoff between the shoulder of the cartridge frame 620 and the head body 502. In addition, the machine bolts 622 are electrically isolated from the cartridge frame 620 by plastic insulating sleeves 624.

A port insert 650 is inserted into the cartridge frame 620. An insert input coolant port 652 and an insert output coolant port 654 are formed through the port insert 650. This provides a water or oil circulation channel that extends through the length of the cartridge frame 620 so that water or oil can be circulated in contact with the backside of the target 610. Water or oil is provided to these ports via respective target supply tube 660 and a target return tube 662.

Two o-rings, an insert/cartridge forward o-ring 656 and insert/cartridge rear o-ring 658 are located between the outer periphery of the port insert 650 and the inner wall of the cartridge frame 620. These provide a fluid tight seal to ensure that coolant does not leak out of the cooling loop for the target 610.

The port insert 650 is secured into the cartridge frame 620 by an insert thrust ring 664. Specifically, the thrust ring engages with the remote end of the port insert 650 and screws onto thrust ring threads 632 formed on the remote end of the cartridge frame 620. This thrust ring 664 is tightened down on to the cartridge frame 620 to seat the port insert 650 into the inner side of the cartridge frame 620. Also note that this configuration allows the loosening of the thrust ring and the rotation of the target so that the beam will strike a fresh region of the target, though the target will eventually experience burn in. On the other hand, when fully tightened, the thrust ring mechanically stabilizes the target in the head.

Also note that in alternative embodiments, the water is replaced with oil as the cooling fluid. Oil provides better electrical isolation allowing better control of the target voltage and target current monitoring. In addition, the voltage control is also used to check if there is proper isolation between the target and ground. By applying a voltage and then reading the leakage current is used to measure the leakage resistance of the target to ground.

In one embodiment, a scattered electron detector 672 is further provided in the head beam port 510 or possibly the head x-ray port 512. This allows the controller 200 to monitor the magnitude of electrons that are scattered from the target 610 via the scattered electron monitoring line 210. This signal is used by the system controller 200 to determine the amount of target burn-in caused by the electron beam.

On other examples, target burn-in is determined by the target current signal 212 or through a combination of the target current signal 212 and scattered electron monitoring line 210.

Figure 5:
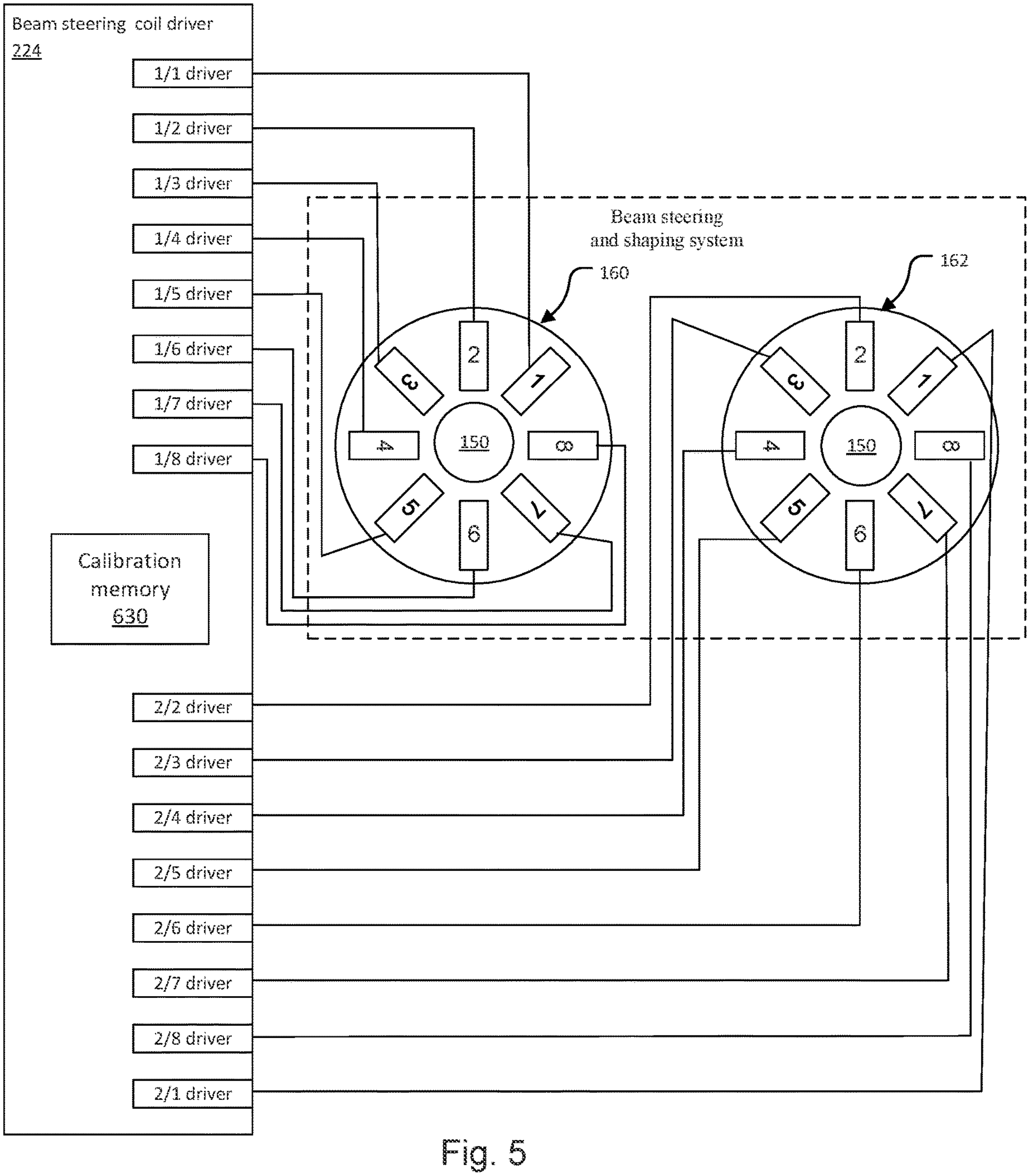
FIG. 5 is a schematic diagram showing the beam steering driver 224 providing individual coil control to the beam steering and shaping system 600.

FIG. 5 is a schematic diagram showing the beam steering driver 224 and the beam steering and shaping system for the electron beam B in the flight tube 150.

The control of first steering/shaping unit 160 and the second steering/shaping unit 162 is performed by the system controller 200. It has individual control of each of the eight coils 1-8 of each of the two units 160, 162. In more detail, the beam steering coil driver 224 comprises two banks of eight coil drivers. These coil drivers enable the drive the system controller 200 to individually control the current in each coil of each of the two units. This level of control allows the beam B to be both steered and shaped.

In the current embodiment, a calibration memory 630 is added to the printed circuit board 632 on which the sixteen coils are installed. The memory 630 is read and programmed from the control board. It stores the mapping between the different drivers and the coils and the polarity of those coils.

Figure 6:
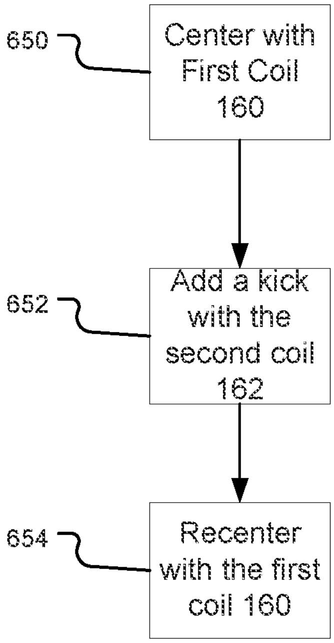
FIG. 6 is a flow diagram showing a control method for the electron beam and the resulting spot on the target based on a determined kick ratio.

FIG. 6 is a flow diagram showing a control method for calibrating the "kick ratio" between the first octopole steering system 160 and second octopole steering system 162. Having this kick-ratio enables the change in angle at which the electron-beam is passing through the center of the magnetic lens system 301.

To ensure that the spot does not shift or drift, its location on the target is actively controlled by the system controller 200. The beam is controlled so that it always hits the same target spot during an imaging operation and then can later be steered to a new spot for a subsequent imaging operation.

In the past, the spot could be laterally shifted, but the optical properties of the focused electron beam B would change significantly if the beam did not go through the optical center of the magnetic lens. The present approach employs dual-stage steering by the first octopole steering system 160 and second octopole steering system 162. Thus, the beam B can always be steered through the center of the magnetic lens system 301. The location of the spot on the target is then changed by changing the angle at which the beam passes through the center of the magnetic lens, in two orthogonal directions. To achieve this steering, it is necessary to first determine the kick ratio.

According to the method, in the first step 650, the first octopole steering coil 160 is used to center the electron beam in the centering aperture. This is performed by the control system 200 controlling each of the 8 coils to minimize the aperture current signal 214, or by maximizing the target signal. Still another option is to monitor the scattered electron signal 210.

Figure 7A:
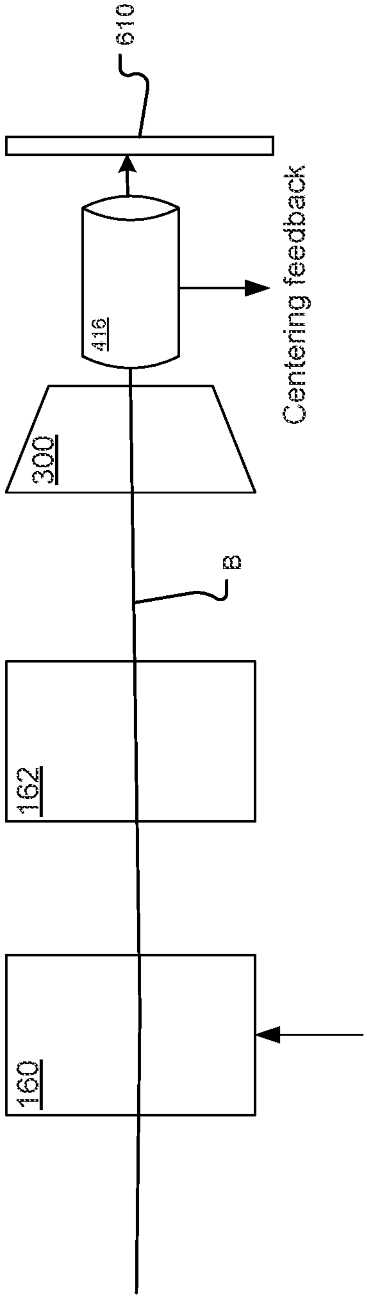
FIGS. 7A-7C are side views illustrating the control method of FIG. 6.

This step is illustrated in FIG. 7A showing the first octopole steering system 160 guiding the beam B through the center of the magnetic lens system 301 using the feedback from the centering aperture current signal 214 and/or target current/voltage signal 212 and/or the scattered electron signal 210.

Figure 7B:
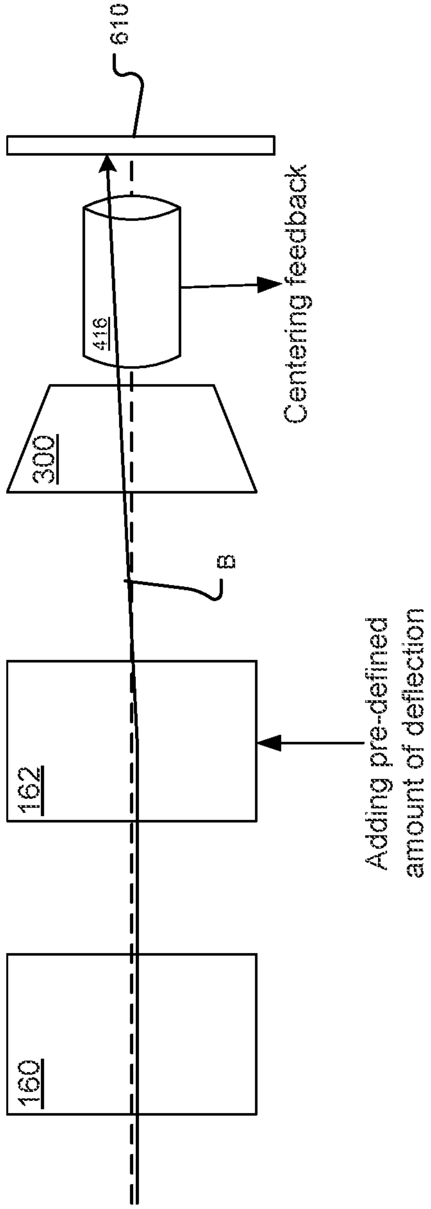

In the second step 652, the second octopole steering coil 162 is used to deflect the electron beam B by deflecting the beam B by a predefined amount. This is performed by the control system 200 controlling each of the 8 coils of the second octopole steering coil 162. This step is illustrated in FIG. 7B.

In the third step 654, the first octopole steering coil 160 is used to recenter the electron beam in the centering aperture 416. This is performed by the control system 200 controlling each of the 8 coils to minimize the aperture current signal 214. The kick-ratio is then computed as the predefined deflection amount of the second set of octopoles, divided by the found change in the centering amplitude of the first set of octopoles.

Figure 7C:
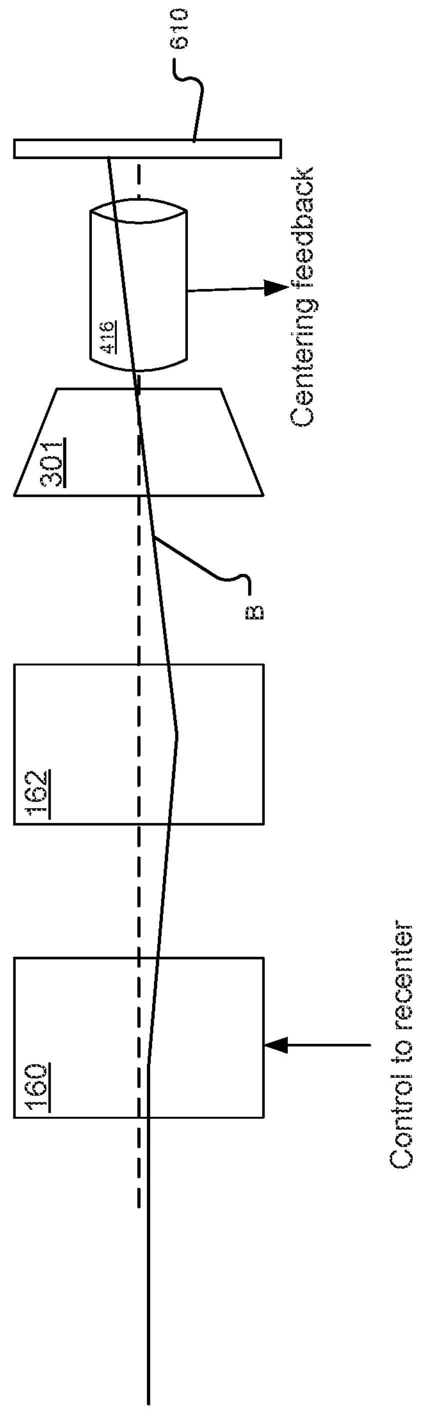

This step is illustrated in FIG. 7C showing the first octopole steering system 160 guiding the beam B through the center of the magnetic lens system 301 using the feedback from the centering aperture current to yield a dog-leg path for the beam B.

Calibration of steering currents to the beam position on the target can be performed as a function of the source control parameters. That way, always the same target position is bombarded with electrons. Typical control parameters include electron energy, emission current and e-beam focusing current. However, also environmental variables can be included into the stability calibration, such as various component temperatures.

FIG. 7 is a flow diagram showing a control method for steering the electron beam using the kick ratio described in connection with FIG. 6.

First, the desired angular displacements Sx, Sy through the magnetic lens system 301 are calculated in step 660. These angular displacements are determined geometrically by resolving the angles required for the beam to hit the desired spot on the target 610.

The steering angles for the first octopole steering system 160 are TAx, TAy. The first octopole steering system 160 is then driven such that TAx=Sx and TAy=Sy in step 662.

Then the steering or the kick TBx, TBy of the second octopole steering coil 162 is determined based on the kick ratio R. TBx=−R*Sx; TBy=−R*Sy in step 664. This will steer the beam in two dimensions through the center of the magnetic lens system 301, to the desired point on the target 610.

To calibrate exactly where the electron beam is hitting the target, an X-ray fiducial in combination with an X-ray detector needs to be utilized to calibrate the steering direction as well as the magnitude of the displacement, especially since the magnetic lens is also rotating the electron beam about its axis of symmetry.

Figure 9:
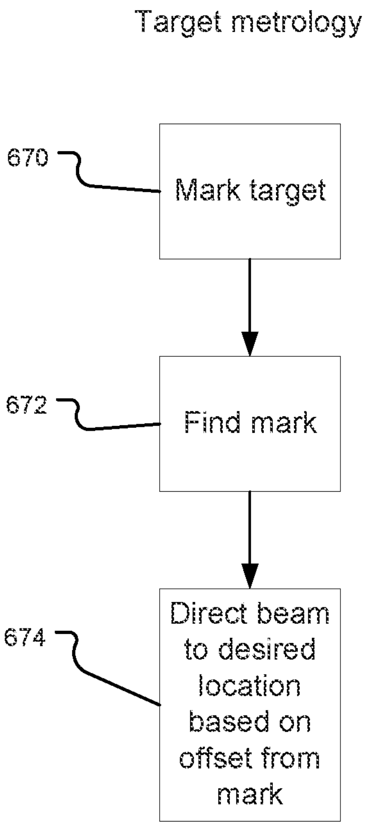
FIG. 9 is a flow diagram showing a control method for the electron beam and the resulting spot on the target by reference to a fiducial on the target.

FIG. 9 is a flow diagram showing a control method for the electron beam to a desired spot on the target 610 with reference to a fiducial.

In more detail, the target is marked with a fiducial in step 670 as part of a manufacturing process or an initial calibration of this target in the system. In one embodiment, the target is marked by burning a line or other mark in the target using the electron beam B. Specifically, the power of the beam is increased to a level that will cause localized target damage.

Then, during later operation, the fiducial mark is located in step 672. In one example, the electron beam is raster scanned over the target 610 by controlling either or both of the first octopole steering system 160 and second octopole steering system 162. The electron beam is detected to be on the mark by monitoring the scattered electron detector signal 210 and/or the target current signal 212.

Figure 8:
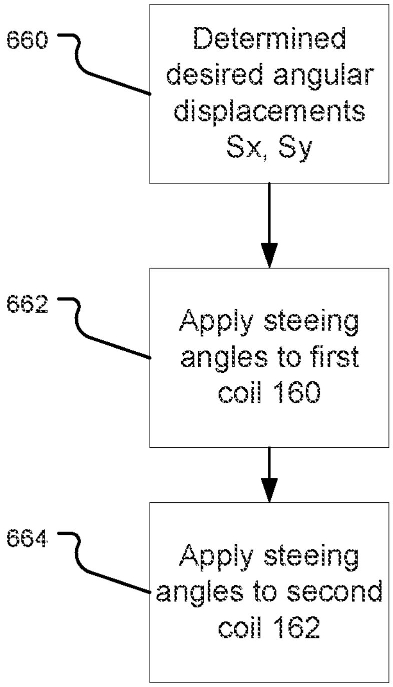
FIG. 8 is a flow diagram showing a control method for steering the electron beam using the kick ratio described in connection with FIG. 6.

Then in step 674, the electron beam B is guided to a desired location on the target based on the offset from the discovered location of the mark as described in connection with FIG. 8.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for controlling a reflective-target type x-ray source, the method comprising:

generating an electron beam for striking a reflective target to generate x-rays;

focusing the electron beam onto the target with a focusing lens;

steering the electron beam to a desired location on the reflective target using a first steering system and a second steering system distributed along a flight tube before the focusing lens, by first deflecting the electron beam by controlling the second steering system; and steering the electron beam by then deflecting the electron beam with the first steering system to pass through a center of the focusing lens and at an angle to the focusing lens to reach the desired location.

2. The method as claimed in claim 1, further comprising determining a kick ratio for controlling the steering of the electron beam.

3. The method as claimed in claim 1, further comprising controlling a centering of the electron beam in a focusing lens using a scattered electron signal indicating electrons that are scattered off of the target and/or a target signal indicating current generated in the target and/or an aperture current signal indicating electrons striking a centering aperture.

4. The method as claimed in claim 1, wherein each of the first steering system and the second steering system comprises at least two electromagnetic coils.

5. The method as claimed in claim 1, wherein each of the first steering system and the second steering system comprises eight electromagnetic coils.

6. The method as claimed in claim 1, further comprising steering the electron beam with reference to a fiducial formed on the target.

7. The method as claimed in claim 1, further comprising steering the electron beam over the target to find a fiducial formed on the target.

8. The method as claimed in claim 1, wherein first deflecting the electron beam by controlling the second steering system comprises providing bank of eight coil drivers for the second steering system and then individually driving each of eight coils by using the bank of eight coil drivers of the second steering system.

9. The method as claimed in claim 8, wherein then deflecting the electron beam by controlling the first steering system comprises providing bank of eight coil drivers for the first steering system and then individually driving each of eight coils by using the bank of eight coil drivers of the first steering system.

10. The method as claimed in claim 1, comprising providing a centering aperture after the first steering system and second steering system along the path of the electron beam, the centering aperture extending through a center of a yoke cap of the focusing lens, wherein centering of the electron beam is determined by an aperture current signal for the centering aperture.

11. A method for controlling a reflective target-type x-ray source, the method comprising:

generating an electron beam for striking a target to generate x-rays; and scanning the electron beam over the target to find a fiducial mark by monitoring a scattered electron detector signal and/or a target current/voltage signal by first deflecting the electron beam by controlling a second steering system and by then deflecting the electron beam with a first steering system to pass through a center of a focusing lens.

12. The method as claimed in claim 11, further comprising after finding the fiducial mark, steering the electron beam based on an offset from the fiducial mark during an imaging operation.

13. The method as claimed in claim 11, wherein scanning the electron beam over the target is performed with a first steering system and a second steering system, each comprising at least two electromagnetic coils.

14. The method as claimed in claim 13, wherein each of the first steering system and the second steering system comprises eight electromagnetic coils.

15. The method as claimed in claim 13, further comprising focusing the electron beam on the target with a focusing lens.

16. The method as claimed in claim 15, wherein the focusing lens is located after the first steering system and the second steering system along path of the electron beam.

17. The method as claimed in claim 15, further comprising steering the electron beam to pass through a center of the focusing lens and at an angle to the focusing lens to reach a desired location.

* * * * *